United States Patent
Kherani et al.

(10) Patent No.: US 8,499,155 B2
(45) Date of Patent: Jul. 30, 2013

(54) ADAPTIVE CERTIFICATE DISTRIBUTION MECHANISM IN VEHICULAR NETWORKS USING VARIABLE INTER-CERTIFICATE REFRESH PERIOD

(75) Inventors: Arzad A. Kherani, Mahasamund (IN); Skanda N. Muthaiah, Bangalore (IN); Debojyoti Bhattacharya, Bangalore (IN)

(73) Assignee: GM Global Technology Operations LLC, Detroit, MI (US)

( * ) Notice: Subject to any disclaimer, the term of this patent is extended or adjusted under 35 U.S.C. 154(b) by 544 days.

(21) Appl. No.: 12/731,063

(22) Filed: Mar. 24, 2010

(65) Prior Publication Data

US 2011/0238986 A1    Sep. 29, 2011

(51) Int. Cl.
  *H04L 9/32*    (2006.01)
  *H04L 29/06*   (2006.01)
(52) U.S. Cl.
  USPC ............................................. 713/168; 726/10
(58) Field of Classification Search
  USPC ........................................................ 713/168
  See application file for complete search history.

(56) References Cited

U.S. PATENT DOCUMENTS

| | | | | |
|---|---|---|---|---|
| 5,768,526 | A | * | 6/1998 | Fawcett ......................... 709/229 |
| 2002/0186660 | A1 | * | 12/2002 | Bahadiroglu .................. 370/248 |

FOREIGN PATENT DOCUMENTS

| | | | |
|---|---|---|---|
| EP | 1041767 | * | 4/2000 |
| WO | WO 02/25866 A2 | * | 3/2002 |

* cited by examiner

*Primary Examiner* — Saleh Najjar
*Assistant Examiner* — Shu Chun Gao
(74) *Attorney, Agent, or Firm* — John A. Miller; Miller IP Group, PLC

(57) ABSTRACT

A method for improving the reliability and performance of Vehicle-to-Vehicle (V2V) networks where digital certificates are necessary for message authentication and some messages may be lost in transmission. The method uses a variable inter-certificate refresh period to optimize communications throughput based on network conditions such as node density and bandwidth saturation. In some network conditions, the inter-certificate refresh period may be increased, such that more certificate digests are sent between full digital certificates, to decrease average message size. In other network conditions, the inter-certificate refresh period may be decreased, to allow for more frequent message authentication by receiving nodes. Empirical data and an adaptive controller are used to select the refresh period which will provide the best performance based on network conditions.

13 Claims, 7 Drawing Sheets

ADAPTIVE CERTIFICATE DISTRIBUTION MECHANISM IN VEHICULAR NETWORKS USING VARIABLE INTER-CERTIFICATE REFRESH PERIOD

BACKGROUND OF THE INVENTION

1. Field of the Invention

This invention relates generally to a method for distributing digital certificates in vehicle-to-vehicle networks and, more particularly, to a method for distributing digital certificates in vehicle-to-vehicle networks which uses a variable inter-certificate refresh period to optimize performance based on network conditions.

2. Discussion of the Related Art

Wireless vehicle-to-vehicle (V2V) communication is becoming increasingly popular as a driver assistance mechanism. V2V communication can be used in systems which provide drivers with important advisories and warnings about the state of traffic in the surrounding environment. Security is an important part of V2V communication, since spurious advisories or warnings shown to a driver based on information from compromised nodes would lead to loss of confidence in the use of V2V systems. It is hence important that messages exchanged between nodes (vehicles) in V2V networks be secured against malicious entities intent on manipulating the system or disrupting the service.

Security in a V2V network can be provided by using digital signatures based on public key cryptography (PKC). An important requirement of PKC-based security protocols is the exchange of public keys through a secure and trusted channel. Digital certificates provide the means necessary for establishment of a secure channel to exchange the public key between a transmitting node and receiving nodes. A digital certificate, among other parameters, typically contains a unique certificate identifier, along with the public key, which is needed for message authentication. Since bandwidth in wireless V2V networks is at a premium, message size must be kept to a minimum. For this reason, a common strategy used in V2V networks is not to transmit a digital certificate with every message. Instead, a certificate may be appended only to messages at a certain interval, such as every fifth message, where the first, sixth, and eleventh messages include a full certificate, while the second through fifth and seventh through tenth messages include a certificate digest, and so forth. Then, when the next message containing a full certificate is received, the receiving node can validate that the preceding messages with certificate digests were in fact authentic. Since a certificate digest is considerably smaller than a certificate, this strategy accomplishes the objective of reducing message size.

However, V2V networks are characterized by rapidly changing topology, signal strengths are sometimes marginal, and node density can be high. Thus, some transmitted messages can be lost. That is, some messages are not successfully received by nodes which should receive them. If a lost message happens to be one containing a full digital certificate, then the receiving node accumulates a backlog of messages which it cannot authenticate. As a result, performance of real-time messaging systems will suffer, and some critical information may be permanently lost.

There is a need for a certificate distribution mechanism which minimizes message size, while simultaneously minimizing the potential negative impact of lost messages.

SUMMARY OF THE INVENTION

In accordance with the teachings of the present invention, a method is disclosed for improving the reliability and performance of vehicle-to-vehicle (V2V) networks where digital certificates are necessary for message authentication and some messages may be lost in transmission. The method uses a variable inter-certificate refresh period to optimize communications throughput based on network conditions such as node density and bandwidth saturation. In some network conditions, the inter-certificate refresh period may be increased, such that more certificate digests are sent between full digital certificates, to decrease average message size. In other network conditions, the inter-certificate refresh period may be decreased, to allow for more frequent message authentication by receiving nodes. Empirical data and an adaptive controller are used to select the inter-certificate refresh period which will provide the best performance based on network conditions.

Additional features of the present invention will become apparent from the following description and appended claims, taken in conjunction with the accompanying drawings.

DETAILED DESCRIPTION OF THE EMBODIMENTS

Figure 1:
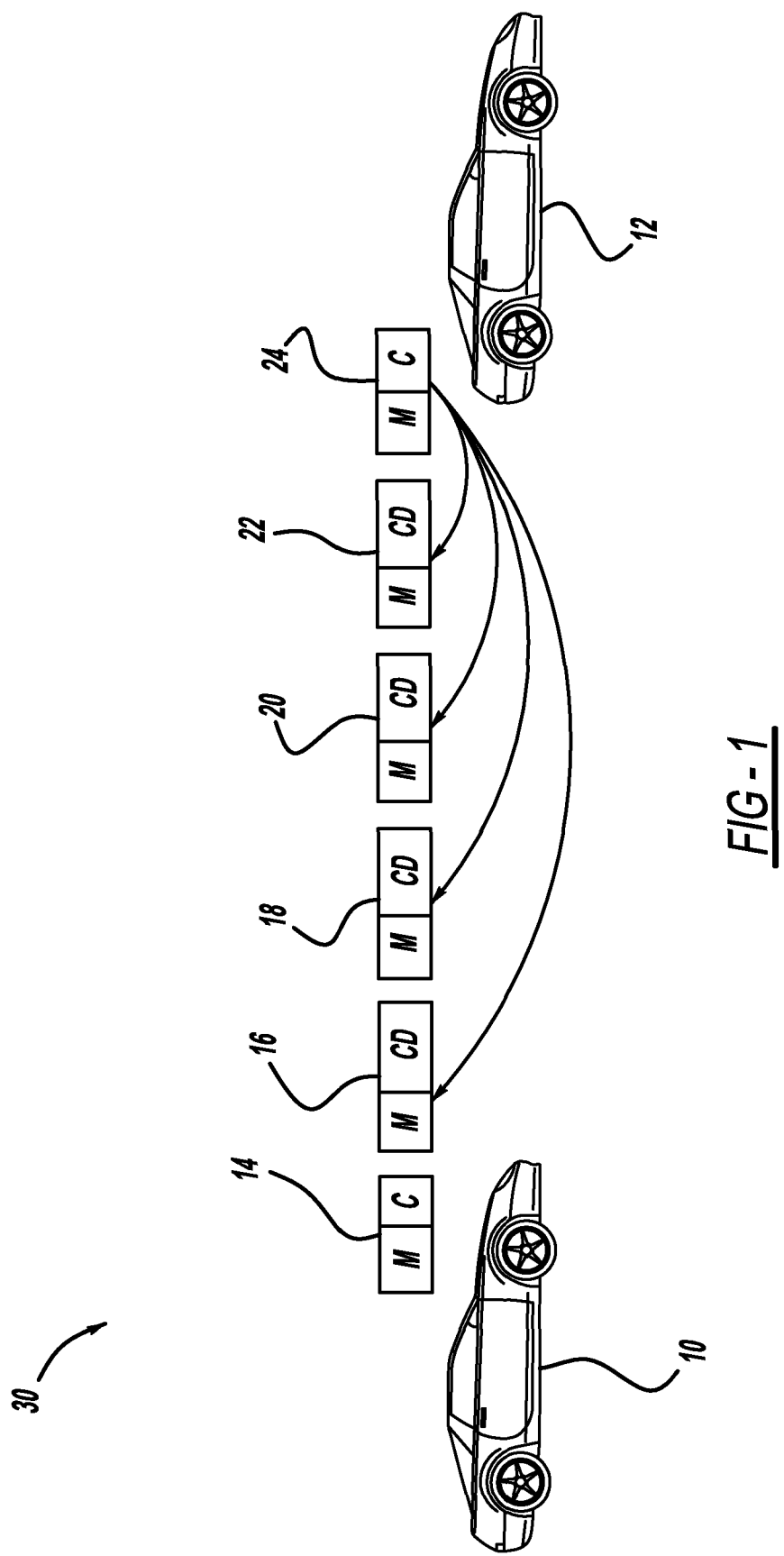
FIG. 1 is a diagram of a wireless vehicle-to-vehicle communication network showing digital certificates and certificate digests being exchanged between two vehicles.

The following discussion of the embodiments of the invention directed to a digital certificate distribution mechanism using a variable inter-certificate refresh period in vehicular networks is merely exemplary in nature, and is in no way intended to limit the invention or its applications or uses.

Wireless Vehicle-to-Vehicle (V2V) communication networks have become increasingly common in automobiles. One of the most popular uses of V2V communication is in vehicle systems, such as collision warning systems. For example, a vehicle can report its position, velocity, and acceleration or braking status, such that other vehicles in the vicinity can receive this information via V2V communication and provide alerts or warnings to the driver if appropriate. Communications security is critical in these applications, since a message with inaccurate information, whether intentional or otherwise, could lead to an accident.

Public key cryptography (PKC) is typically used for message authentication in V2V networks. In public key cryptography, each user has a pair of cryptographic keys—a public key and a private key. The private key is kept secret, while the public key may be widely distributed. The keys are related mathematically, but the private key cannot be feasibly derived from the public key. In public key cryptography, a digital certificate is an electronic document which uses a digital signature to bind together a public key with an identity— which in the case of a V2V network is an identity of a vehicle or individual, or any other attribute that is uniquely associated with the entity. Using digital signatures, a message signed with a sender's private key can be verified by anyone who has access to the sender's public key, thereby proving that the sender had access to the private key, and that the message has not been tampered with. An important requirement of PKC-based security protocols is the transmission of a public key belonging to an entity to a receiver through a secure and authentic channel that prevents another entity from claiming ownership of the public key being transmitted. Digital Certificates are employed as a mechanism to enable a secure channel for transmission of public keys authentically.

Thus, digital certificates are an important enabler of the security necessary in V2V networks. However, certificates create overhead in V2V systems, both in terms of communication bandwidth and storage. It is desirable to minimize this overhead by not attaching a full digital certificate to every message transmitted. Current V2V standards for certificate distributions require a certificate to be appended to the transmitted messages periodically, based on an inter-certificate refresh period L. For example, if the inter-certificate refresh period L is set to five, then a certificate is appended to every $5^{th}$ transmitted message, while the intervening four messages in each sequence are appended with a certificate digest. Certificate digests are 256-bit hash functions of a certificate. A cryptographic hash function is a deterministic procedure that takes an arbitrary block of data and returns a fixed-size bit string, the cryptographic hash value, such that an accidental or intentional change to the data will change the hash value. In this case, the data to be encoded is the digital certificate, and the hash value is the certificate digest (CD). The IEEE 1609.2 standard recommends using the lower 8 bytes of the 32-byte hash output, this being considered as a valid digest for the certificate. Thus, a certificate digest is only 8 bytes in size, while a full digital certificate is about 118 bytes in size. This approach, sending CD's instead of full certificates for the majority of messages, is designed to reduce bandwidth and storage overheads typically associated with transmitting packets with certificates appended to the message.

FIG. 1 is a diagram of a network 30 of two vehicles communicating in a V2V environment per the current standard. In the network 30, vehicle 10 is transmitting information, and vehicle 12 is receiving. For illustration and clarity purposes, the communication in the network 30 is described as being one-directional, that is, from the vehicle 10 to the vehicle 12. In reality, each vehicle participating in a vehicle-to-vehicle network would both transmit and receive information, using an onboard transceiver for transmitting and receiving message packets, and an onboard controller or processor for processing message data and using it in an application. V2V applications require frequent communication of vehicle kinematical information, on the order of 10 messages per second. Therefore, there is a constant stream of messages being exchanged by vehicles in a given network topology. In V2V terminology, a communication packet consists of both a message payload, represented by M in FIG. 1, along with its appended certificate (C) or certificate digest (CD). The message payload includes useful application data, along with numerous data fields containing information about the message, such as security type and transmission data rate, as specified by the IEEE 1609.2 standard.

In this scenario, the inter-certificate refresh period L is set to five. The vehicle 10 sends packet 14, which contains both a message payload and a full digital certificate. If the vehicle 12 receives the packet 14, the vehicle 12 can verify the authenticity of the packet 14 via the certificate. The vehicle 12 can then use the application data in the message payload, which in this case is kinematical data for the vehicle 10, in its application software. Further, upon successful reception of the digital certificate and verification, the vehicle 12 stores the certificate in its cache for a time interval as determined by the recommended privacy settings or certificate expiry time. All messages corresponding to this digital certificate received within this time interval no longer need to wait for the reception of another digital certificate. Instead the certificate digests of these packets are verified through a simple operation that involves computing the hash of the stored digital certificate and comparison of the last 8 bytes of the computed hash with the received certificate digests. Upon expiry of the time interval, the certificate is flushed out and the entire process repeats.

If the packet 14 is not received by the vehicle 12, there are consequences for not only the packet 14, but also for subsequent packets, as will be seen. The vehicle 10 then proceeds to send packets 16, 18, 20, and 22, each of which contains a message and a certificate digest. The vehicle 12 may receive all of the packets 16-22. However, if the packet 14 was not successfully received and no digital certificate is available in cache, the vehicle 12 cannot verify the authenticity of the packets 16-22 until it receives another full digital certificate, which will enable it to verify the CD which was attached to the packets 16-22. In the case where no valid certificate is available in cache, the vehicle 12 must store the packets 16-22 in a buffer for later use if buffer space is available. If insufficient buffer space is available, some or all of the packets 16-22 may be dropped, resulting in a loss of useful information.

The vehicle 10 then sends packet 24, which includes a data message and a full digital certificate. If the vehicle 12 receives the packet 24, and if the packets 16-22 are still stored in the buffer, the vehicle 12 can verify the authenticity of the stored packets 16-22, and can then use the data from the messages in the packets 16-24 in its application software. However, if the vehicle 12 fails to receive the packet 24, the vehicle 12 cannot authenticate the packets 16-22, and therefore cannot use the data from the messages in the packets 16-22 in its application software. In that case, the vehicle 12 can only keep the packets 16-22 in storage, until it receives a full certificate which can be used to validate them. But the vehicle 10 will not send another full digital certificate for five more messages. If even one certificate-carrying packet is lost, at a transmission frequency of 10 packets per second, it can be seen that some data messages may be delayed from being used in the application software by almost one full second. This is a long time for a collision warning system. If the next certificate-carrying packet also happens to be lost, the time delay of the data becomes even worse, some packets may have to be dropped from the receiver's buffer, and the application's performance will continue to deteriorate.

In real V2V communication networks, packet losses are a fact of life. There are many reasons that a transmitted packet may not be received by some nodes in a network. One of the fundamental characteristics of vehicular networks is the mobility of nodes relative to each other, leading to a high rate of changes in network topology. Hence, node mobility contributes to nodes moving in and out of communication range of neighboring nodes, thus increasing the likelihood of packet loss in transmission. Packet collisions, where two or more nodes attempt to send a packet across the network at the same time, also contribute to the problem of packet loss. In addition, buffer overflows in receiving nodes can also lead to packet loss. Given these realities of V2V networks, some messages and some digital certificates are bound to be lost, leading to the data delay or data loss condition detailed above. To avoid this problem, two different adaptive methodologies for digital certificate distribution are proposed.

In a first embodiment, the inter-certificate refresh period L is varied to adapt to current V2V network conditions. Referring again to FIG. 1, the two goals to be balanced are minimizing security-related communications overhead, while maximizing V2V message throughput. It is desirable from an overhead minimization standpoint to increase the value of L; that is, to use relatively more certificate digests and fewer certificates. However, this strategy guarantees that more messages will have to be buffered by receiving nodes before being used in their application software, and it increases the potential negative impact of a dropped certificate-carrying packet—possibly leading to the loss of useful information. On the other hand, reducing the value of L increases the amount of overhead due to security-related data on a per-message basis, and could increase the chance that any particular message will be lost in a congested network.

Many factors can affect the performance of a V2V network at any particular time. These factors include the number of participating nodes (vehicles), the spatial and mobility patterns of the nodes, bandwidth saturation, the tolerance to delays of the application software used in the vehicles, characteristics of the physical channel, and others. Because these factors and their effects can vary so widely, it is not possible to select a single value of the inter-certificate refresh period L which will provide the best results under all conditions. Therefore, an adaptive strategy is proposed, in which the value of L may be varied, up or down, based on current network conditions. In this approach, a controller would be programmed to periodically monitor the V2V network factors described above, such as number of participating nodes and bandwidth saturation. Based on the monitored conditions of the network, and empirical data on network performance as a function of the various factors, the controller would select an optimum value of L to use for an interval of time. Monitoring of network conditions and selecting an optimum value of L would be repeated periodically, in order to maintain network throughput at or near its peak value. It may also be desirable to have the interval of time, during which the value of L is fixed, be a variable amount. That is, in some network conditions, monitoring and re-establishing a value of L may occur more frequently than in other network conditions. Actual network performance, as measure by the rate at which useful message data is being processed by receiving nodes, could also be measured and used to establish the optimum value of the inter-certificate refresh period L.

Figure 2A:
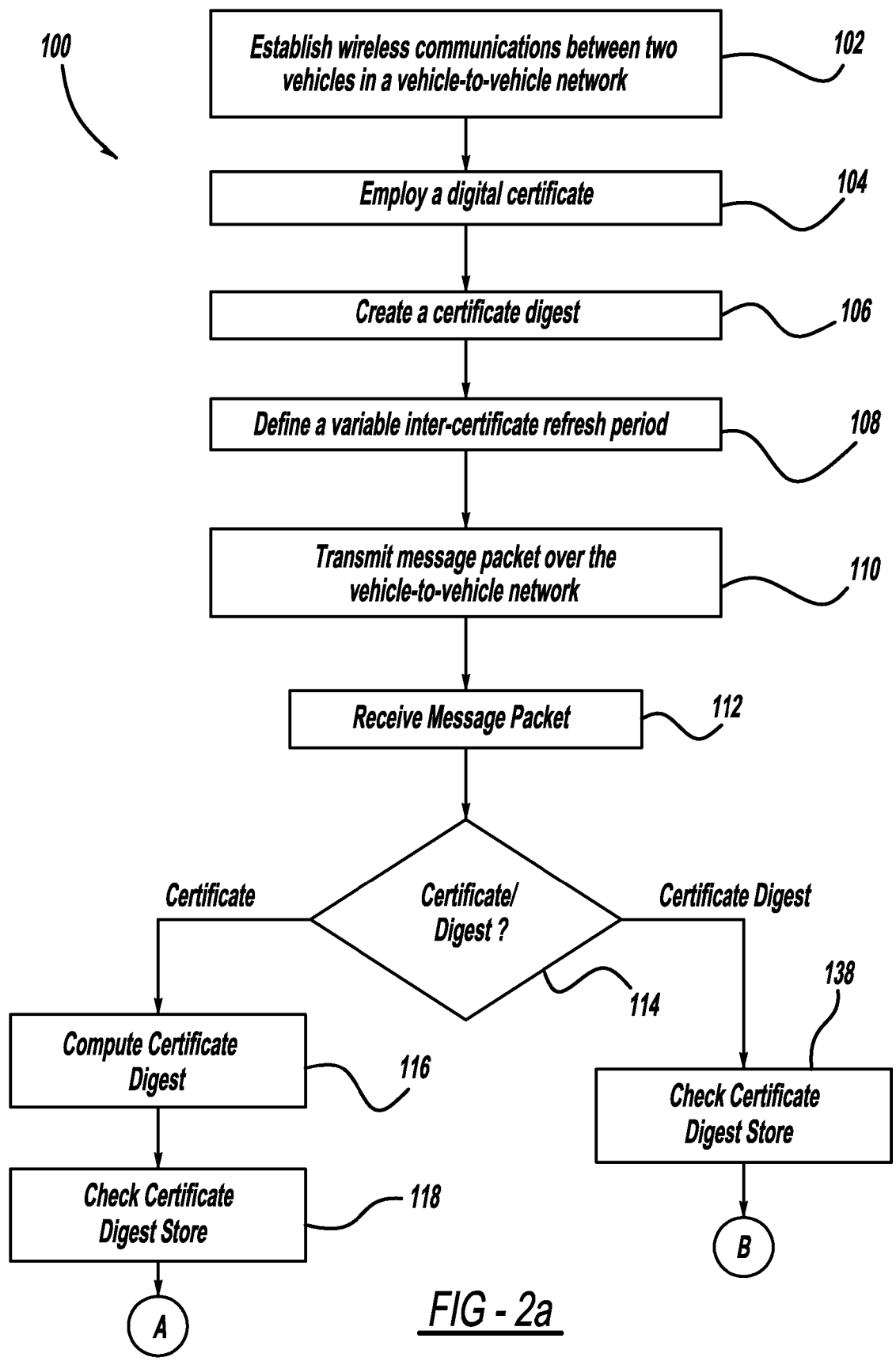
FIG. 2 is a flow chart diagram of a process for distributing digital certificates using a variable inter-certificate refresh period.
Figure 2B:
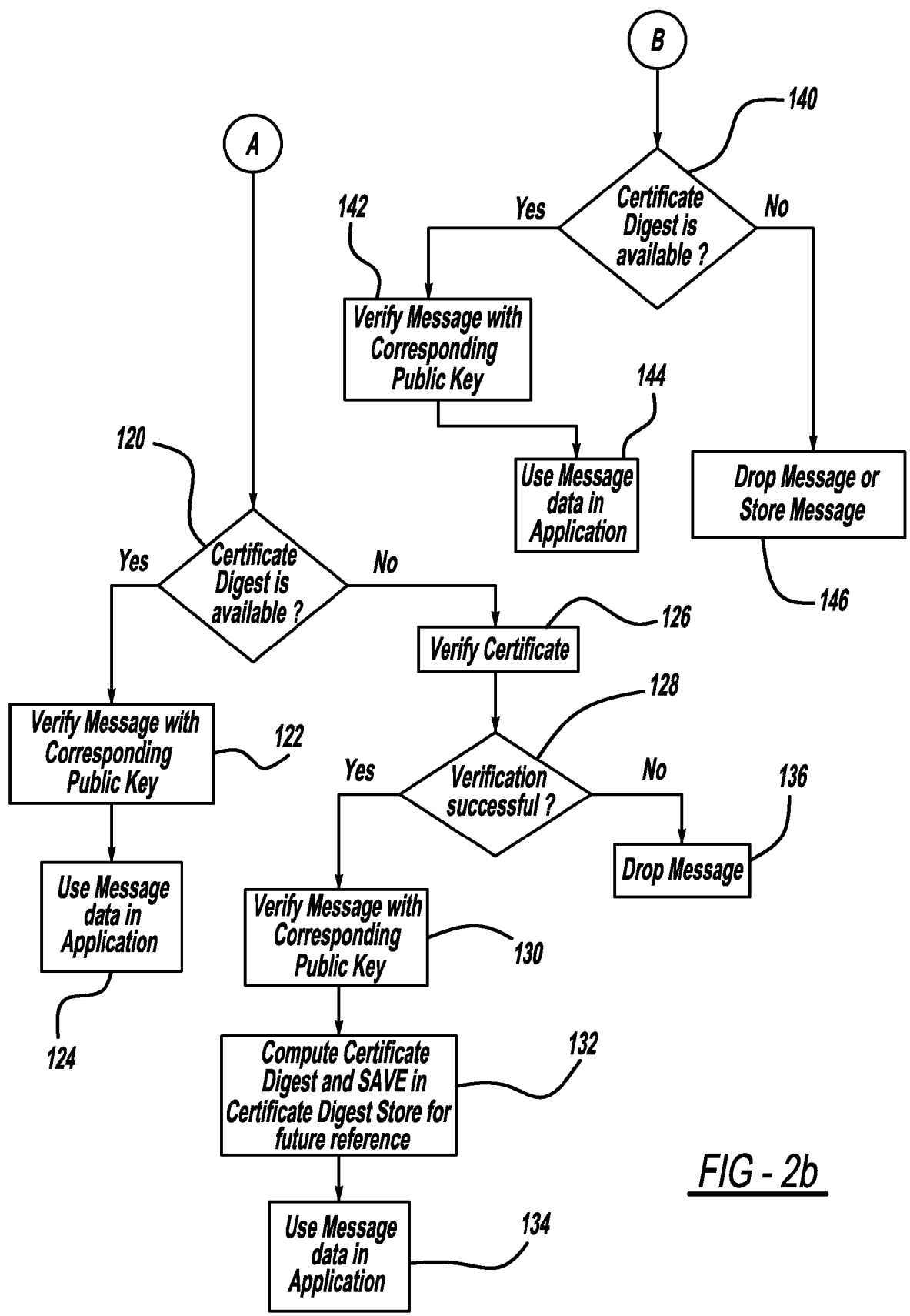

FIG. 2 is a flow chart diagram 100 of a process for distributing digital certificates using a variable inter-certificate refresh period L. At box 102, wireless communications are established between two or more vehicles in a vehicle-to-vehicle network. For the purposes of this discussion, the vehicles 10 and 12 of FIG. 1 will be referenced, where the vehicle 10 is transmitting messages and the vehicle 12 is receiving messages. At box 104, the vehicle 10 employs a digital certificate, which was pre-installed in the onboard processor prior to start of V2V operation. At box 106, the vehicle 10 creates a certificate digest as a hash function of the digital certificate. At box 108, the vehicle 10 defines a value for the inter-certificate refresh period L. As described above, the value of L may be established based on measured network conditions, such as node density and bandwidth saturation. Alternatively, the value of L may be established and continuously updated based on actual network performance, which may be defined as the rate at which useful message data is being processed into receiving nodes' applications. At box 110, the vehicle 10 transmits a message packet over the vehicle-to-vehicle network. Transmission continues at 10 messages per second, or whatever frequency is dictated by the applications being used. Each message packet contains useful message data and other data fields, along with either a digital certificate or a certificate digest, as prescribed by the inter-certificate refresh period.

At box 112, the vehicle 12 receives the transmitted message packet. At decision diamond 114, the vehicle 12 checks to see if the received packet contains a full certificate or a certificate digest. If a full certificate was received, the vehicle 12 computes a digest of the certificate at box 116. At box 118, the vehicle 12 checks a certificate digest store for previously received certificate digests. At decision diamond 120, the vehicle 12 checks to see if a digest exists which matches the one computed at the box 116 for the just-received certificate. If so, this means that a message has previously been received from the same transmitting vehicle 10, and the public key associated with the matching stored certificate digest can be used to verify the received message at box 122. At box 124, the useful message data from the received message can be used in the application by the vehicle 12.

If no matching certificate digest is found at the decision diamond 120, then the digital certificate must be verified by the vehicle 12 at box 126, using a certificate verification algorithm of the type known to those skilled in the art. At decision diamond 128, the vehicle 12 checks to see if the certificate verification was successful at the box 126. If so, then the received message can be verified with the corresponding public key at box 130. At box 132, the vehicle 12 computes a digest of the received certificate and saves it in the certificate digest store for future use. At box 134, the useful message data from the received message can be used in the application by the vehicle 12. If verification was not successful at the decision diamond 128, then the vehicle 12 will drop the received message at box 136.

From the decision diamond 114, if the received message contains a certificate digest, the vehicle 12 checks the certificate digest store at box 138. If a matching certificate digest is found at decision diamond 140, the vehicle 12 verifies the message at box 142 and uses the message data at box 144, as was described previously for the boxes 122 and 124. If no matching certificate digest is found at the decision diamond 140, then the received message cannot currently be verified and used, so the vehicle 12 can only store the message at box 146, or drop the message if sufficient buffer space is not available. The steps of the boxes 112 through 146 are used in typical V2V operations today, and are detailed here to show the importance of not experiencing a lengthy delay in receiving a full digital certificate.

In any pass through the process of the diagram 100, the vehicle 10 can define a new value for the inter-certificate refresh period L at the box 108, based on changes to the measured network conditions, or changes in the actual network performance. The vehicle 10 need not communicate the value of L to other vehicles in the network. The vehicle 10 can simply use the value of L that is determined to provide the best network performance, and send digital certificates and CD's accordingly.

The adaptive strategy of varying the inter-certificate refresh period L has a number of advantages. First, the method employing a variable L can be used in networks together with nodes which use the traditional fixed-L methodology, with no changes of hardware or software required from any of the nodes. Nodes which use the traditional fixed-L methodology could continue to operate as normal, but they would see the benefit of improved communications throughput in messages they receive from the node which uses the variable-L method in messages it transmits. Second, a node which uses the variable-L method does not need to communicate the value of L to the receiving nodes. The receiving nodes can receive and process packets as they would in a fixed-L environment, verifying the authenticity of preceding CD's each time a full certificate is received. Finally, the variable-L method creates no additional overhead compared to the traditional fixed-L method, which is an important criterion in a V2V network.

In a second embodiment, Forward Error Correction techniques can be used, where a certificate is divided among several packets, and the certificate can be reconstructed even if some packets are lost by the receiver. Forward Error Correcting (FEC) codes can be used as a means to recover data in lossy environments. By over-sampling the input data, FEC codes create data larger than the input, such that the loss of a few data segments in transmission will not prevent the receiver from reconstructing the original data completely. Applied to the problem of certificate transmission in V2V networks, FEC codes offer a mechanism for receiving nodes to reliably recover certificates, thus reducing the information blockage to the application layer and reducing the need for re-transmission of data. Two different types of FEC codes—Erasure Codes and Fountain Codes—are proposed.

Figure 3:
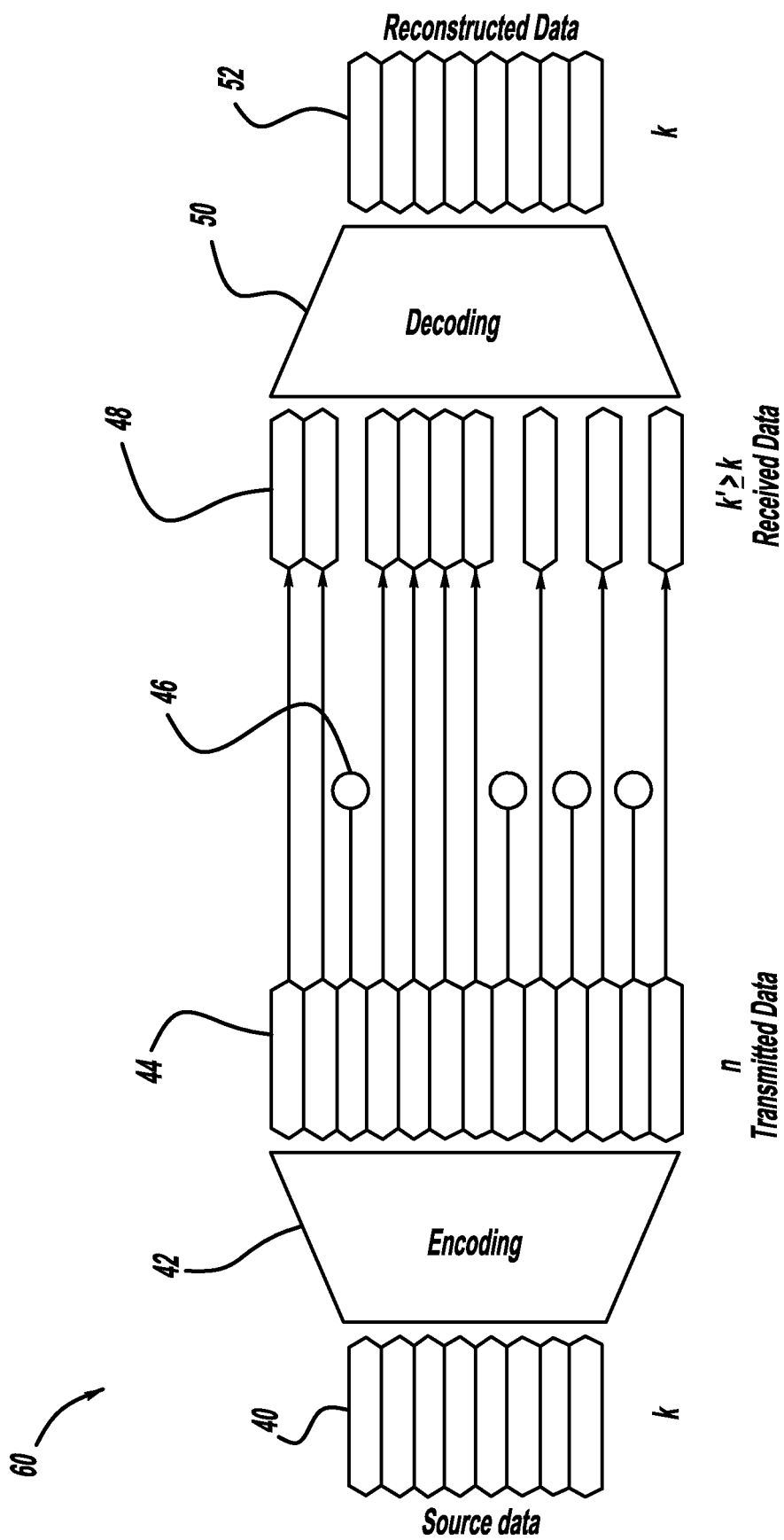
FIG. 3 is a diagram of a schema showing how Erasure Codes are used to encode and decode data.

FIG. 3 is a diagram of a schema 60 showing how erasure codes are used to encode and decode data. Erasure codes are a form of FEC codes which can be used to reconstruct original source data in spite of a loss of a certain number of data packets during transmission. Source data 40 is comprised of a number of segments k. In the case of a digital certificate, the 118 bytes of certificate data can be divided into any suitable number of segments k. In the schema 60, k is shown to be equal to 8, but the value of k could be larger or smaller than 8. An encoding module 42 encodes the k segments of the source data 40 into n segments of transmitted data 44, where n>k. During transmission, some data segments 46 may be lost. Therefore, received data 48 may contain some number k' of data segments, where k'<n. As long as the number k' of data segments in the received data 48 is greater than or equal to k, a decoding module 50 can decode the received data 48 into reconstructed data 52 which is identical to the source data 40, consisting of k segments. The k' segments of the received data 48 can include any of the n segments of the transmitted data 44. That is, there are no requirements that any particular segment must be recovered, nor that two adjacent segments cannot be lost. It is only required that a number k' of unique segments be contained in the received data, where k'≧k.

The fundamental concept of erasure codes lies in the existence of an encoding function θ(X), which acts upon the k-dimensional input vector X and produces an n dimensional output vector Z. The encoding function has the property that $f(X)+f(Y)=f(X+Y)$ and can be represented by a matrix A. Hence, encoding is simply a matrix-vector multiplication leading to the matrix Z. Erasure codes are known to those skilled in the art of numerical methods, and need not be detailed further.

Figure 4:
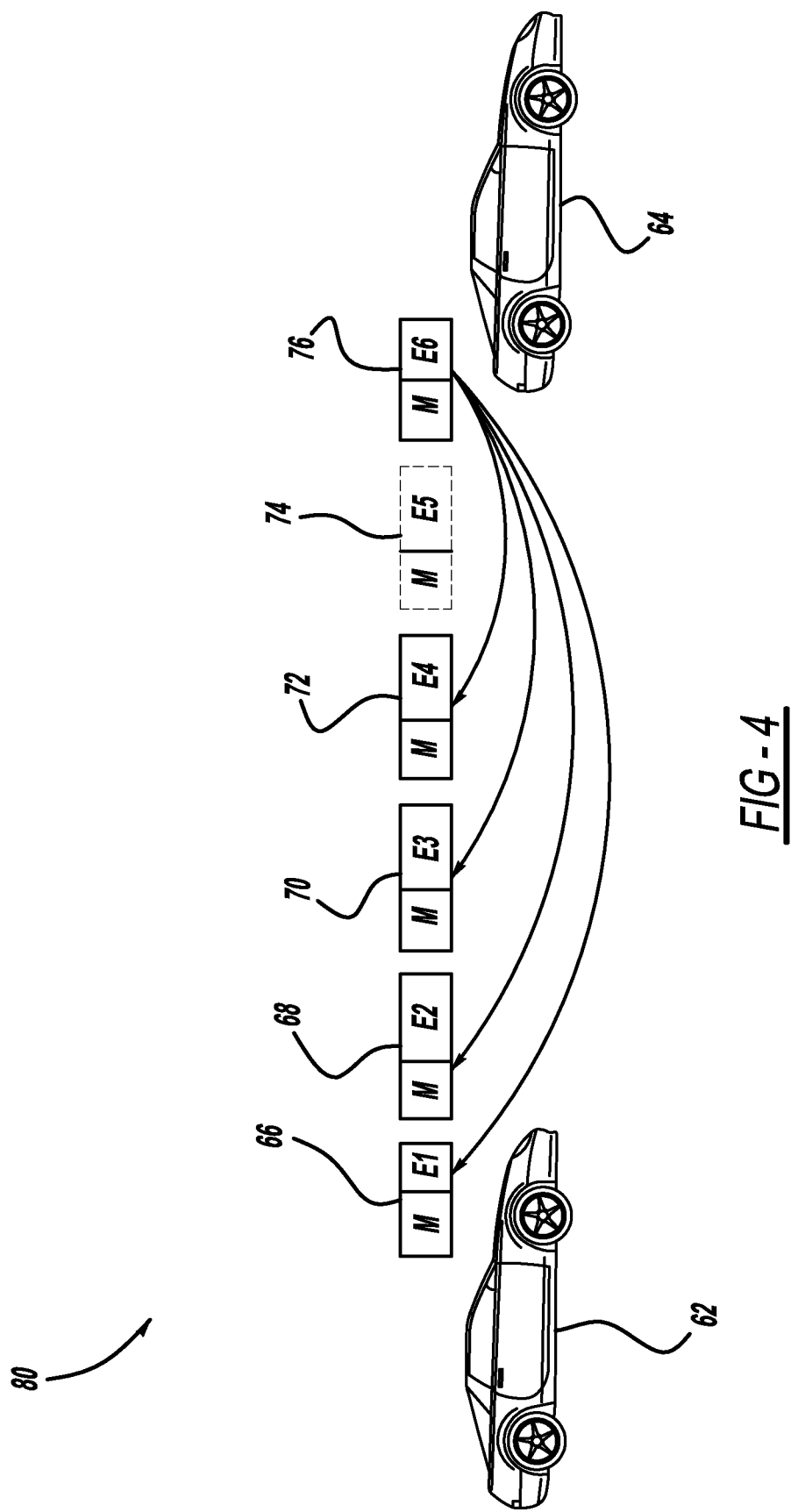
FIG. 4 is a diagram of a wireless vehicle-to-vehicle communication network showing how Erasure Codes can be used to transmit digital certificates between two vehicles.

FIG. 4 is a diagram of a network 80 of two vehicles in a V2V environment, showing how erasure codes can be applied to the transmission of digital certificates. In the network 80, vehicle 62 is transmitting information, and vehicle 64 is receiving, no certificate digests are used, and certificates are encoded into multiple packets using erasure codes. To illustrate the use of erasure codes in this example, the source data, which is the digital certificate, is divided into five segments. That is, k=5. The five source data segments are encoded into six transmitted data segments. That is, n=6. The vehicle 62 transmits a first packet 66, containing a message payload M and a first erasure code segment E1. The vehicle 64 receives and stores the first packet 66. The vehicle 62 proceeds to send packets 68, 70, and 72, each of which is received and stored by the vehicle 64. At this point, the vehicle 64 has received four packets, and hence, four erasure code segments, from the vehicle 62. The vehicle 64 cannot yet decode the certificate, because it has not yet received enough data segments. The vehicle 62 then sends data packet 74, containing a fifth erasure code segment E5. However, the packet 74 is lost in transmission, and is not received by the vehicle 64. The vehicle 62 then sends packet 76, containing a sixth erasure code segment E6. The packet 76 is received by the vehicle 64. This represents a fifth erasure code segment received by the vehicle 64, which enables the vehicle 64 to decode the certificate, authenticate the messages 66-72 and 76, and use all of the message data in its application. The vehicle 62 repeats the transmission sequence after n=6 packets. It is noted that with the erasure code methodology described herein, a single lost packet does not have the potential to cause an entire series of packets to be unusable by the receiver, as is the case with the traditional methodology shown in FIG. 1 when a certificate-carrying packet is lost.

Another form of Forward Error Correcting codes is known as fountain codes. Fountain codes are a class of FEC codes that are capable of producing an infinite set of output segments for a given set of input segments, such that the original input segments can be recovered or reconstructed from any subset of the encoded output segments of size equal to or only slightly greater than the number of input source segments. The number of output segments can also be finite. Fountain code theory is also known to those skilled in the art of numerical methods, and efficient encoding and decoding algorithms exist for making practical use of fountain codes.

Figure 5:
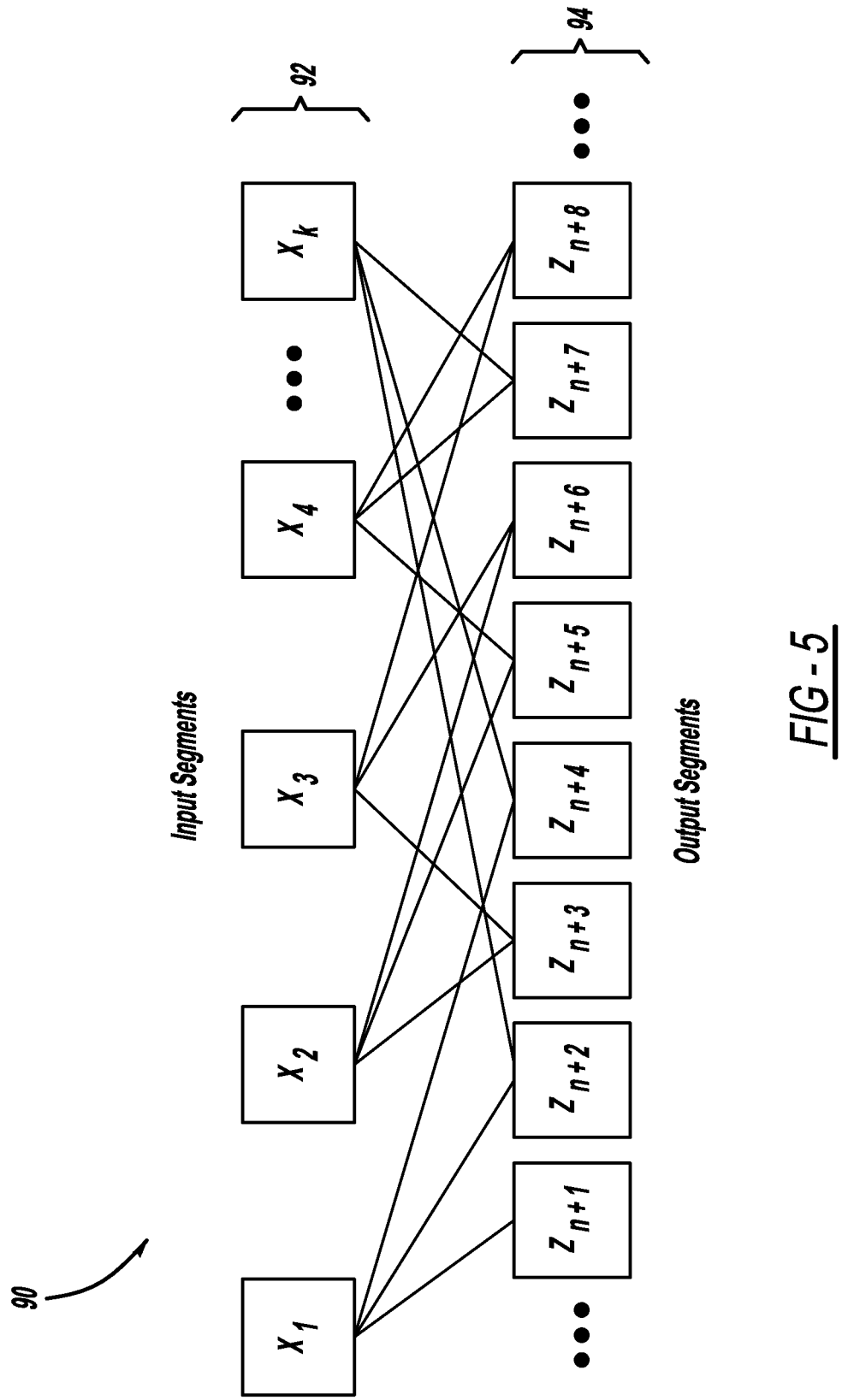
FIG. 5 is a diagram of a schema showing how Fountain Codes are used to encode data.

FIG. 5 is a diagram of a schema 90 showing how fountain codes are used to encode data. As was the case with erasure codes, the source data needs to be divided into a number k of input segments 92. With fountain codes, there is no defined number n of encoded data segments. Rather, the number k of input segments 92 are encoded into an infinite number of output segments 94. When the encoded output segments 94 are transmitted in messages across a network, the receiving node can decode the original input segments 92 when a number k' of segments is received, such that k'=(1+ε)k. According to fountain code theory, the number k' need only be slightly larger than k; that is, ε<<1. For example, if the source data is divided into five input segments 92 (k=5), decoding should be possible when six output segments 94 are received.

Applying fountain codes to the problem of transmitting a digital certificate in a V2V network then becomes straightforward. The source data is the digital certificate, and a value of k must be selected. The certificate is divided into k input segments 92, and fountain codes are used to generate an ongoing stream of output segments 94. Each of the output segments 94 is appended to a message payload in a communication packet which is transmitted over the V2V network. A receiving node receives and stores the received packets until a minimum of k' encoded segments are received. The receiving node then decodes the source data, and recovers the digital certificate to authenticate the messages received. At that point, the data in the message payloads can be processed in the receiver's application, such as a collision warning system. It is noted that the fountain code methodology is very tolerant of lost packets. A receiving node can continue to buffer received packets until a number k' of encoded segments are received, even if several packets have been lost in the interim. Again with fountain codes, a single lost packet does not have the potential to cause an entire series of packets to be unusable by the receiver, as is the case with the traditional methodology shown in FIG. 1 when a certificate-carrying packet is lost. Variations on the fountain code methodology can also be employed by the transmitting node. For example, the transmitting node can re-start the fountain code sequence after a certain amount of time has passed or a certain number of packets have been sent, and the transmitting node would re-start the sequence any time a new digital certificate needed to be used as dictated by the certificate expiry time or privacy concerns.

Figure 6:
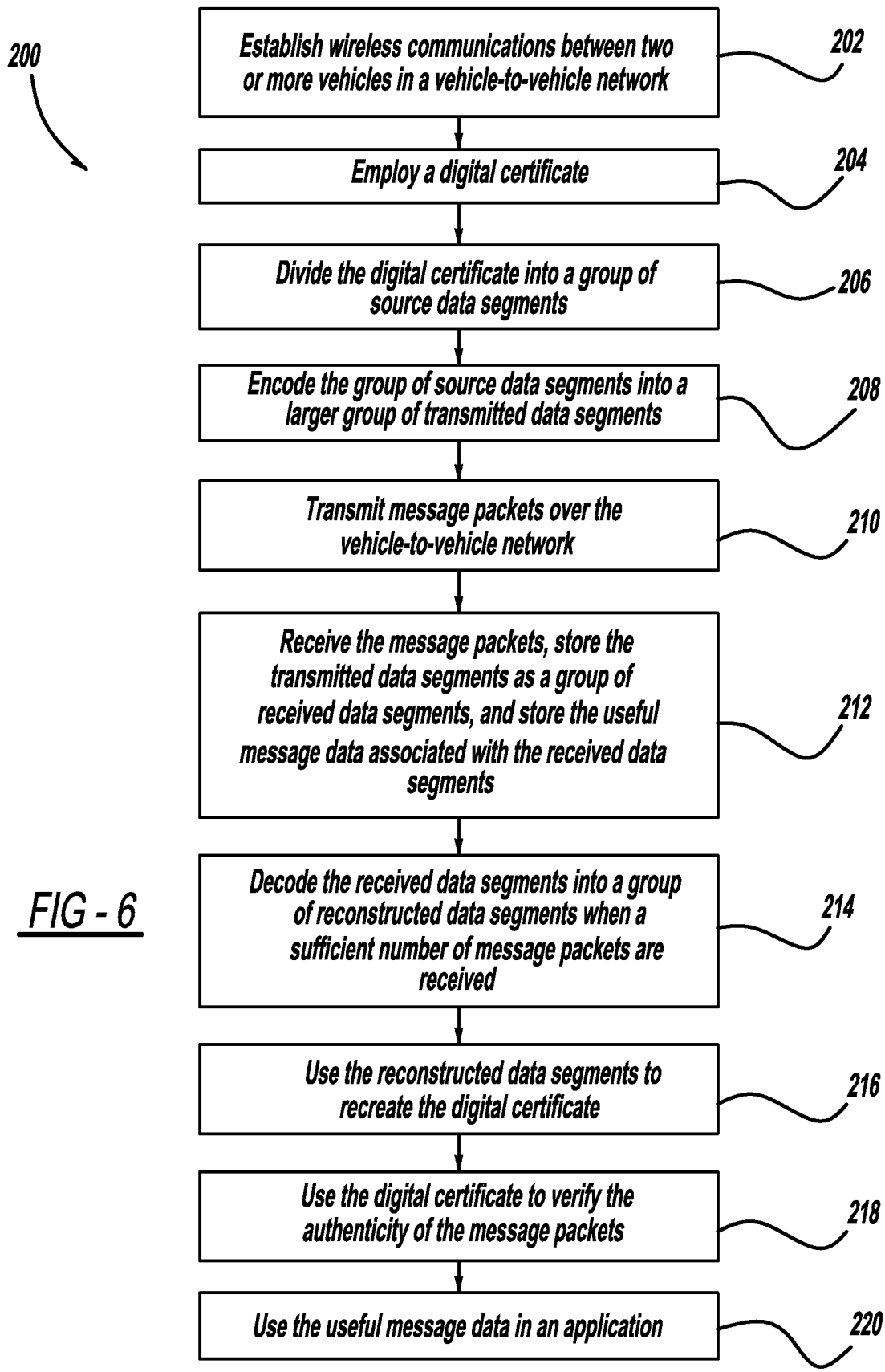
FIG. 6 is a flow chart diagram of a process for distributing digital certificates using forward error correcting codes to encode the certificates for transmission.

FIG. 6 is a flow chart diagram 200 of a process for distributing digital certificates using forward error correcting codes to encode the certificates for transmission. At box 202, wireless communications are established between two or more vehicles in a vehicle-to-vehicle network. For the purposes of this discussion, the vehicles 62 and 64 of FIG. 4 will be referenced, where the vehicle 62 is transmitting messages and the vehicle 64 is receiving messages. At box 204, the vehicle 62 employs a digital certificate, which has been pre-installed in its onboard processor. At box 206, the vehicle 62 divides the digital certificate into a group of source data segments. The group of source data segments has a size of k, as described previously. At box 208, the vehicle 62 encodes the group of source data segments into a larger group of transmitted data segments. For erasure codes, the group of transmitted data segments has a size of n; for fountain codes, the group of transmitted data segments can be infinite in size. At box 210, the vehicle 62 transmits message packets over the V2V network. The message packets contain the encoded transmitted data segments and useful message data.

At box 212, the vehicle 64 receives the message packets, and stores the data segments and message data in a buffer. At box 214, the vehicle 64 decodes the received data segments into a group of reconstructed data segments. This can only be done when a sufficient number of data segments have been received, as explained previously. For erasure codes, the number of received data segments must be greater than or equal to the number of source data segments. That is, $k' \geq k$. For fountain codes, the number of received data segments must be slightly greater than the number of source data segments. That is, $k'=(1+\epsilon)k$, where $\epsilon \ll 1$. In either case, erasure codes or fountain codes, the receiving vehicle 64 can reconstruct the source data even if some message packets are lost in transmission. At box 216, the vehicle 64 uses the reconstructed data segments to re-create the digital certificate sent by the vehicle 62. At box 218, the vehicle 64 uses the digital certificate to verify the authenticity of the message packets it has received. And at box 220, the vehicle 64 processes the useful message data it has received in its application.

Other strategies can be employed to improve the reliability and performance of V2V network communications where digital certificates are distributed using FEC codes. One strategy that can be used is to adaptively change the encoding parameters k and n in response to network conditions, where the parameter k applies to both erasure codes and fountain codes, and the value of n applies only to erasure codes. For example, some network conditions may dictate that the values of k and n both be made larger, while other network conditions may yield better performance when both k and n are smaller. Also, for a given value of k, a network which is experiencing very few lost packets may provide the best results by setting n=k+1. But in a very lossy network environment, the value of n may need to be significantly higher than k. Although adaptively changing the values of n and k may be an effective strategy for dealing with variable network conditions, it is noted that certificate segments created for certain values of n and k are incompatible with certificate segments created for different values of n and/or k.

Another strategy which can be used to optimize V2V network performance is to append more than one FEC encoded segment to each transmitted packet, under certain network conditions. That is, even where the encoding parameters k and n are chosen and held constant, it is possible and permissible to append more than one encoded segment to each packet, in order to maximize the rate at which message data is received, authenticated, and processed into the receiving node's application. Thus, if k=5 and n=6, and two segments are attached to each packet, the receiving node would have enough segments to decode the certificate after receiving three packets. The strategy of appending more than one encoded data segment to each message packet applies to both erasure codes and fountain codes.

Given the wide variation in V2V network topologies—including number of nodes in the network, vehicle to vehicle ranges, bandwidth saturation, etc.—it is impossible to select values for the encoding parameters n and k, and a number of segments per packet, which will produce the optimum results under all network conditions. For example, in the erasure code model, setting the value of n much higher than k will result in each encoded segment being larger, which increases network traffic. But setting the value of n too low may result in less tolerance of lost packets. Likewise, increasing the ratio of segments per packet allows the receiving node to decode the certificate after receiving fewer packets, but it also increases the likelihood of dropped packets due to the increased packet size. These tradeoffs are known and understood, and network performance could be empirically measured across a wide range of network conditions for different combinations of parameters. Such an empirical study would allow an adaptive strategy to be implemented which periodically updates the values of the encoding parameters and the ratio of segments per packet, using the combination which would yield maximum data throughput under current network conditions.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for distributing digital certificates in a vehicle-to-vehicle network, said method comprising:
  establishing wireless communications between two vehicles in the vehicle-to-vehicle network, where a first vehicle is transmitting messages and a second vehicle is receiving messages;
  measuring current network conditions, where the network conditions include number of vehicles in the network, spatial and mobility patterns of the vehicles in the network, and bandwidth saturation;
  employing a digital certificate by the first vehicle, where the digital certificate contains information which can be used to verify authenticity of messages sent by the first vehicle over the vehicle-to-vehicle network;
  creating a certificate digest by the first vehicle, where the certificate digest is a hash function of the digital certificate;
  defining a variable inter-certificate refresh period by the first vehicle, said variable inter-certificate refresh period being a number of message packets in a set, where a last message packet in the set includes the digital certificate and all previous message packets in the set include the certificate digest, and where a value for the variable inter-certificate refresh period is established to optimize performance of the vehicle-to-vehicle network based on the measured current network conditions, and the variable inter-certificate refresh period remains at the established value for an interval of time;

transmitting a message packet over the vehicle-to-vehicle network by the first vehicle, where the message packet contains message data and either the digital certificate or the certificate digest as dictated by the inter-certificate refresh period;

receiving the message packet by the second vehicle, and determining if the message packet contains the digital certificate or the certificate digest;

verifying the message packet by the second vehicle if the message packet contains the digital certificate, or if the message packet contains the certificate digest and a matching digital certificate for the certificate digest has previously been received;

storing the message packet by the second vehicle if the message packet contains the certificate digest and the matching digital certificate for the certificate digest has not previously been received, and if storage space is available;

dropping the message packet by the second vehicle if the message packet contains the certificate digest and the matching digital certificate for the certificate digest has not previously been received, and if storage space is not available; and using the message data in the message packet, if the message packet is verified, in an application by the second vehicle.

2. The method of claim 1 further comprising measuring performance of the vehicle-to-vehicle network as a function of network and configuration parameters, where the network and configuration parameters are allowed to vary throughout their permissible range.

3. The method of claim 2 wherein the network and configuration parameters include number of vehicles in the network, spatial and mobility patterns of the vehicles in the network, bandwidth saturation, and the inter-certificate refresh period.

4. The method of claim 1 wherein the interval of time is variable, where the interval of time is determined based on the measured current network conditions.

5. The method of claim 1 further comprising receiving by the first vehicle feedback from the second vehicle regarding actual performance of the vehicle-to-vehicle network.

6. The method of claim 5 wherein a value for the variable inter-certificate refresh period is established based on the actual performance of the vehicle-to-vehicle network.

7. A method for distributing digital certificates in a vehicle-to-vehicle network, said method comprising:
  establishing wireless communications between two vehicles in the vehicle-to-vehicle network, where a first vehicle is transmitting messages and a second vehicle is receiving messages;
  measuring performance of the vehicle-to-vehicle network as a function of network and configuration parameters, where the network and configuration parameters are allowed to vary throughout their permissible range, and the network and configuration parameters include number of vehicles in the network, spatial and mobility patterns of the vehicles in the network, bandwidth saturation, and the inter-certificate refresh period;
  employing a digital certificate by the first vehicle, where the digital certificate contains information which can be used to verify authenticity of messages sent by the first vehicle over the vehicle-to-vehicle network;
  creating a certificate digest by the first vehicle, where the certificate digest is a hash function of the digital certificate;
  measuring current network conditions by the first vehicle;
  defining a value of an variable inter-certificate refresh period to optimize the performance of the vehicle-to-vehicle network based on the measured current network conditions by the first vehicle, said variable inter-certificate refresh period being a number of message packets in a set, where a last message packet in the set includes the digital certificate and all previous message packets in the set include the certificate digest, and where a value for the variable inter-certificate refresh period is established to optimize the performance of the vehicle-to-vehicle network based on the measured current network conditions, and the variable inter-certificate refresh period remains at the established value for an interval of time;
  transmitting message packets over the vehicle-to-vehicle network by the first vehicle, where the message packets contain message data and either the digital certificate or the certificate digest as dictated by the variable inter-certificate refresh period;
  receiving the message packet by the second vehicle, and determining if the message packet contains the digital certificate or the certificate digest;
  verifying the message packet by the second vehicle if the message packet contains the digital certificate, or if the message packet contains the certificate digest and a matching digital certificate for the certificate digest has previously been received;
  storing the message packet by the second vehicle if the message packet contains the certificate digest and the matching digital certificate for the certificate digest has not previously been received, and if storage space is available;
  dropping the message packet by the second vehicle if the message packet contains the certificate digest and the matching digital certificate for the certificate digest has not previously been received, and if storage space is not available; and
  using the message data in the message packet, if the message packet is verified, in an application by the second vehicle.

8. The method of claim 7 wherein the network conditions include number of vehicles in the network, spatial and mobility patterns of the vehicles in the network, and bandwidth saturation.

9. A distribution system for distributing digital certificates in a vehicle-to-vehicle network, said distribution system comprising:
  a first vehicle in the vehicle-to-vehicle network;
  a first application system in the first vehicle, where the first application system contains information about the first vehicle to be provided to other nearby vehicles in the form of message data;
  a first communication system in the first vehicle, where the first communication system includes a controller configured to select a value for a variable inter-certificate refresh period and determine whether to send a digital certificate or a certificate digest, said controller also being configured to measure current network conditions, where the network conditions include number of vehicles in the network, spatial and mobility patterns of the vehicles in the network, and bandwidth saturation, and where a value for the variable inter-certificate refresh period is established to optimize performance of the vehicle-to-vehicle network based on the measured current network conditions, and the variable inter-certificate refresh period remains at the established value for an interval of time, and a transmitter for transmitting message packets containing the message data and either the digital certificate or the certificate digest;

a second vehicle in the vehicle-to-vehicle network;

a second communication system in the second vehicle, where the second communication system includes a receiver for receiving the message packets and separating the message packets into the message data and either the digital certificate or the certificate digest, and a processor configured to validate the certificate digests with the digital certificates which are received; and a second application system in the second vehicle, where the second application system processes the message data after validating the digital certificate or the certificate digest for each message packet.

10. The distribution system of claim 9 wherein the controller in the first vehicle uses the measured current network conditions to select the value for the variable inter-certificate refresh period.

11. The distribution system of claim 9 wherein the processor in the second vehicle is configured to provide feedback to the controller in the first vehicle regarding actual performance of the vehicle-to-vehicle network.

12. The distribution system of claim 11 wherein the controller in the first vehicle uses the actual performance of the vehicle-to-vehicle network to select the value for the variable inter-certificate refresh period.

13. The distribution system of claim 9 wherein the first application system and the second application system are collision avoidance systems.

* * * * *